Figure 1:
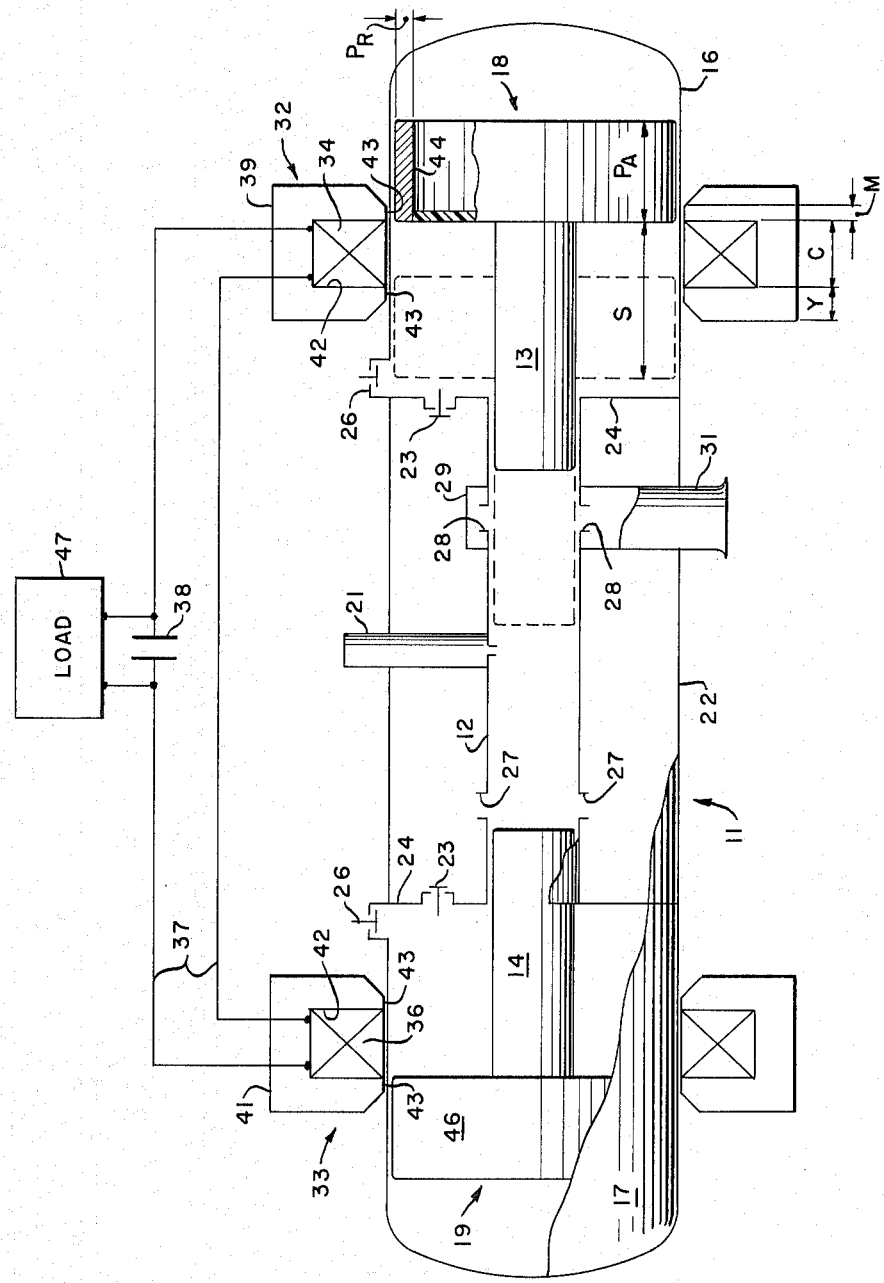

Feb. 8, 1966  S. A. COLGATE  3,234,395
FREE PISTON ELECTRICAL GENERATOR
Filed Feb. 1, 1962  4 Sheets-Sheet 1

INVENTOR:
STIRLING A. COLGATE

BY: William D. Hager
ATTORNEY

Feb. 8, 1966 S. A. COLGATE 3,234,395
FREE PISTON ELECTRICAL GENERATOR
Filed Feb. 1, 1962 4 Sheets-Sheet 3

INVENTOR:
STIRLING A. COLGATE

BY: *William D. Hager*
ATTORNEY

United States Patent Office

3,234,395
Patented Feb. 8, 1966

---

3,234,395
FREE PISTON ELECTRICAL GENERATOR
Stirling A. Colgate, Livermore, Calif., assignor of
one-half to Richard M. Colgate, Oldwick, N.J.
Filed Feb. 1, 1962, Ser. No. 170,451
14 Claims. (Cl. 290—1)

The present invention relates to apparatus for the generation of electrical power and more particularly to means for generating electrical power directly from the reciprocating elements of free piston engines.

The conventional rotary electrical generator is an inherently complex mechanism and must be coupled to a bulky and equally complex driving engine. In order to provide a simpler and more compact generation means, various mechanisms have heretofore been proposed for the purpose of producing current directly from the reciprocating pistons of an engine. As heretofore designed, these mechanisms have been relatively inefficient in comparison with the rotary generator. Owing to this, as well as other factors which will be herein discussed, these mechanisms have not been widely used.

A mechanism of this type which does offer high efficiency, as well as other desirable characteristics, is described in U.S. Patent 2,904,701 issued to the present inventor September 15, 1959, for Electrical Generator and Driving Engine Unitary Therewith. The foregoing patent employs a parametric generation principle by which current is produced by forcing the oscillation of one of the parameters of a resonant output circuit, across which the load is connected, at the resonant frequency of the circuit. In particular, the generator output circuit is formed by an annular coil and a capacitor connected thereacross and the inductance of the circuit is oscillated by the forced reciprocation of a thick conductive element along the axis of the coil. The apparatus is simple and compact in that the coil is disposed coaxially around the cylinder of a free piston engine, the piston thereof functioning directly as the reciprocating conductive element of the output circuit.

The apparatus of U.S. Patent 2,904,701 is distinct from prior generation means in that the moving armature element, i.e., the engine piston, is formed of non-magnetic material which excludes the stator field of the coil in contrast to conducting the field as is the case with conventional iron armatures. Owing to the absence of iron in the piston-armature, it is relatively light and may therefore be readily reciprocated at the high speeds, e.g., 60 cycles per second, to provide current at preferred frequencies.

In contrast to the apparatus of the foregoing patent, the present invention provides techniques for utilizing iron elements in a reciprocating generator of the parametric oscillator type. By means of these techniques, the advantage of iron over non-magnetic elements, specifically greater electrical efficiency at a given size and output frequency, may be realized. The greater efficiency of the iron piston of the present invention derives chiefly from the fact that it is not subject to same degree of electrically induced heating and consequent power loss, as the non-magnetic piston.

However as noted above, an iron piston must generally have greater mass than a non-magnetic piston and consequently requires more driving power for reciprocation at a given frequency. In some installations, the advantages of low piston heating and high efficiency will outweigh the disadvantage of high piston mass.

While the choice between the two types of piston must be made according to the particular requirements of each specific installation, the iron system of the present invention will generally be found preferable in smaller size generators. Since the magnetic flux of the stator must penetrate the iron of the piston, the volume of flux displaced cannot exceed the volume of iron in the piston. If the highest obtainable flux density is present, which as a practical matter is about 15,000 gauss, then the piston iron can do useful electrical work at a maximum rate of about one joule per cubic centimeter per half cycle. A non-magnetic piston on the other hand does useful work on the basis of the volume of excluded magnetic flux. For this purpose the non-magnetic piston must have a wall thickness at least equal to the electrical skin depth at the frequency of reciprocation. Consequently the wall thickness of a smaller sized non-magnetic piston may be a substantial proportion of the piston radius. In this situation the non-magnetic piston may have no weight advantage over an iron piston and will, as has been discussed, have greater electrical power losses from piston heating.

The present invention preferably makes use of a free piston engine as a driving means, certain of the reciprocating elements thereof being formed of iron to forcibly oscillate the inductance of a resonating output circuit. To minimize vibration it is preferred that the engine be of the class which has two opposed pistons. In engines of this type, each engine piston carries an enlargement, or bounce piston, on the end remote from the combustion chamber. The bounce piston acts to compress a volume of air during the power stroke and the compressed air acts to return the piston for the subsequent compression stroke. Movement of the two pistons must be synchronized so that each approaches the center of the common cylinder simultaneously.

The electrical elements which are added to the engine to effect power generation include a pair of annular coils which encircle the engine, coaxially with respect to the cylinder thereof, the coils being electrically connected to a capacitor to form a circuit resonant at a frequency corresponding to the reciprocation rate of the engine piston. In order to provide for maximum inductance in the circuit, an annular iron yoke is preferably disposed around each coil in coaxial relationship therewith, each yoke having radially directed side walls which extend towards the engine on each side of the associated coil to form a pair of annular magnetic pole tips encircling the engine on each side of each of the coils.

To force electrical oscillation of the coil capacitor circuit, an iron annulus is disposed coaxially within each coil, the annuli being mounted within the engine on reciprocating elements thereof. In smaller embodiments of the invention additional coupling may be obtained by providing a stationary iron core within the reciprocating annuli.

To most effectively utilize the foregoing mechanism for power generation, several unique structural relationships between the described elements should be met. Considering first factors affecting the spacing of the pole tips, and thus the axial thickness of the coils, it will be observed that the inducance of the output circuit is maximized when the reciprocating iron annulus spans the gap between the pole tips and overlaps each thereof. The circuit inductance is reduced substantially to the minimum when the reciprocating annulus has moved just clear of the gap between the pole tips. Accordingly the length of the iron annulus, in the axial direction, should be equal to the axial thickness of both pole tips plus the axial length of the gap therebetween and the stroke of the annulus should equal its own length plus the gap length. This stroke is normally identical to that of the engine piston and thus the specified parameters are fixed by the engine piston stroke.

Considering now the location and proportioning of the reciprocating iron annuli, such elements should have an outside diameter substantially equal to the inside diameter of the iron yokes of the stator coils. In order to provide a constant flux path, the annuli should have a radial thickness equal to the thickness of the stator pole tips as measured in the axial direction.

As has been pointed out, the iron of the reciprocating element can do useful electrical work at the rate of approximately one joule per cubic centimeter of volume per half cycle of reciprocation. Most driving engines, whether operating on a diesel or otto cycle, deliver from one half to one joule per cubic centimeter of piston displacement volume. However the reciprocating iron, as has been indicated, has a length less than the engine piston stroke and has a restricted radial thickness. Accordingly, to bring the electrical work done by the reciprocating iron into balance with the work delivered by the engine piston, it is necessary that the former have a greater diameter than the latter. The present invention provides for this by mounting the reciprocating iron on the bounce piston rather than on the smaller engine piston. Similarly the stator assemblies, including the coils and iron yokes, encircle the engine in the regions of the bounce pistons rather than that of the combustion cylinder.

The requirement that the reciprocating iron annuli have a larger diameter than the engine pistons results in the invention being readily adaptable to existing free piston engines. For reasons not connected with electrical generation, most such engines are designed with bounce pistons of greater diameter than the engine pistons.

Considering still a further novel feature of the invention, the high efficiency of the iron system is realized by constructing both the stator coil yokes and the reciprocating iron annuli to have high electrical resistance in the circumferential direction, thereby substantially eliminating induced currents and the consequent power loss. This may be most effectively accomplished by forming each of the specified iron members with closely spaced radially directed laminations.

The invention has the further property of allowing a simplification of the free piston engine by eliminating the need for a mechanical linkage to effect synchronization of the motion of the opposed pistons. The necessary piston synchronization is inherent in the invention as described above as a result of the interaction of the reciprocating iron annuli with the field of the stator coils. The field attracts each piston as it moves into the associated coil and each piston delivers energy back to the field as it leaves the coil. This produces a phase stabilizing effect since if a piston should become advanced from the stable phasing, it must withdraw from the field at a time when the field is of higher intensity and will therefore be forced to do more work. The piston will therefore be slowed relative to the other piston and synchronization will be restored. Conversely, should a piston be retarded from the stable phasing it will do less work on withdrawing from the lower field and will therefore be accelerated relative to the other piston.

Since both pistons are thus locked in phase with the oscillations of the coil magnet field, the pistons are effectively synchronized with each other and the consequent absence of mechanical synchronizing linkage considerably simplifies the free piston engine.

It is accordingly an object of this invention to provide a highly efficient, compact and simplified means for the generation of electrical power.

It is an object of this invention to provide improved means for the direct generation of electrical power from the reciprocating elements of internal combustion engines.

It is another object of the invention to provide a simple and convenient means for adapting existing free piston engine designs for the efficient direct generation of electrical power.

It is still another object of this invention to provide a parametric oscillator power generation system adaptable to free piston engines and utilizing a novel iron magnetic circuit for optimum performance.

It is a further object of this invention to provide novel structure for optimizing the transfer of energy from a reciprocating iron piston to a resonating electrical output circuit.

It is an object of the invention to provide for the minimizing of power losses in the iron elements of a reciprocating generator.

It is still a further object of the invention to provide electrical means for synchronizing piston motion in multi-piston free piston engines.

Figure 2:
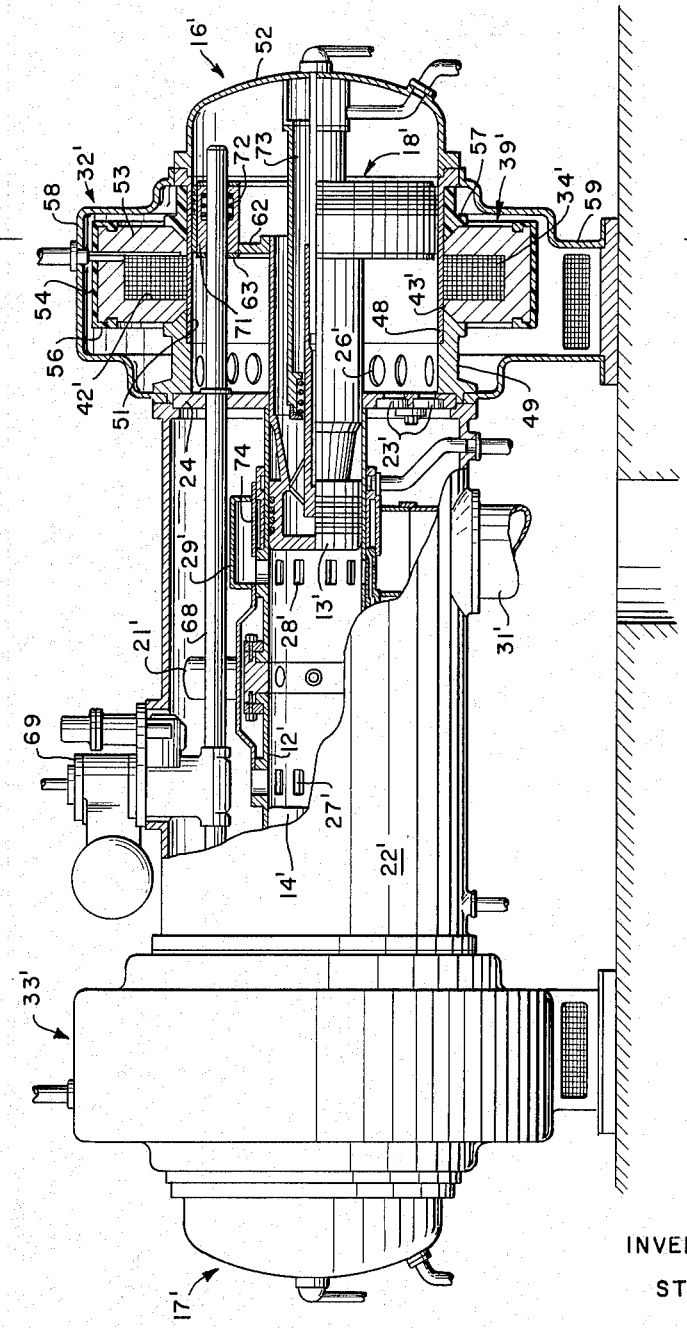
Figure 3:
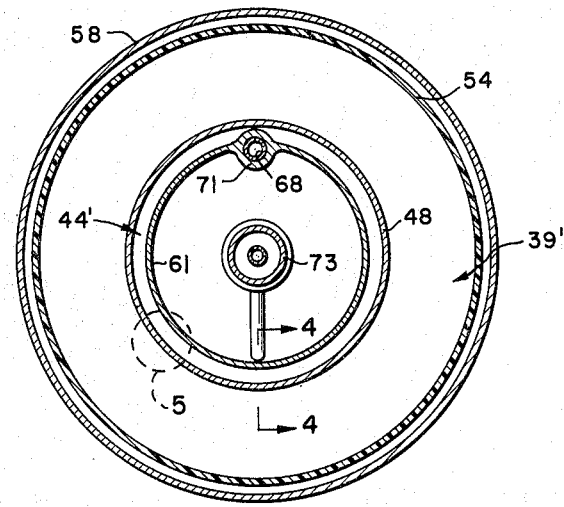

The invention, both as to its organization and method of operation, together with further objects and advantages thereof, will best be understood by reference to the following specification taken in conjunction with the accompanying drawing, in which;

FIGURE 1 is a simplified schematic view illustrating certain of the basic features of the invention as applied to a typical free piston engine, FIGURE 2 is a detailed broken out elevation view of a free piston engine having the novel electrical power generating elements mounted therein, FIGURE 3 is a cross-section view taken along line 3—3 of FIGURE 2 and illustrating the construction of certain of the electrical components of the apparatus thereof.

Figure 4:
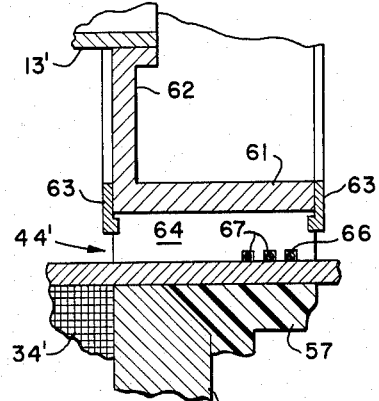
Figure 5:
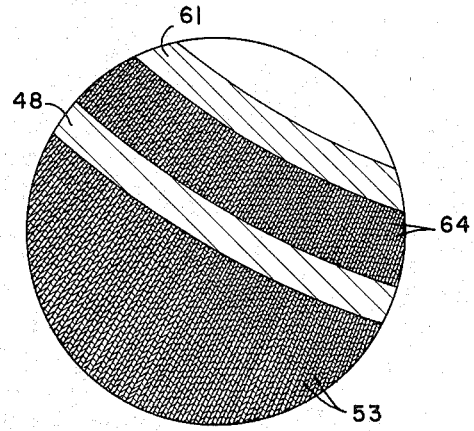
Figure 6:
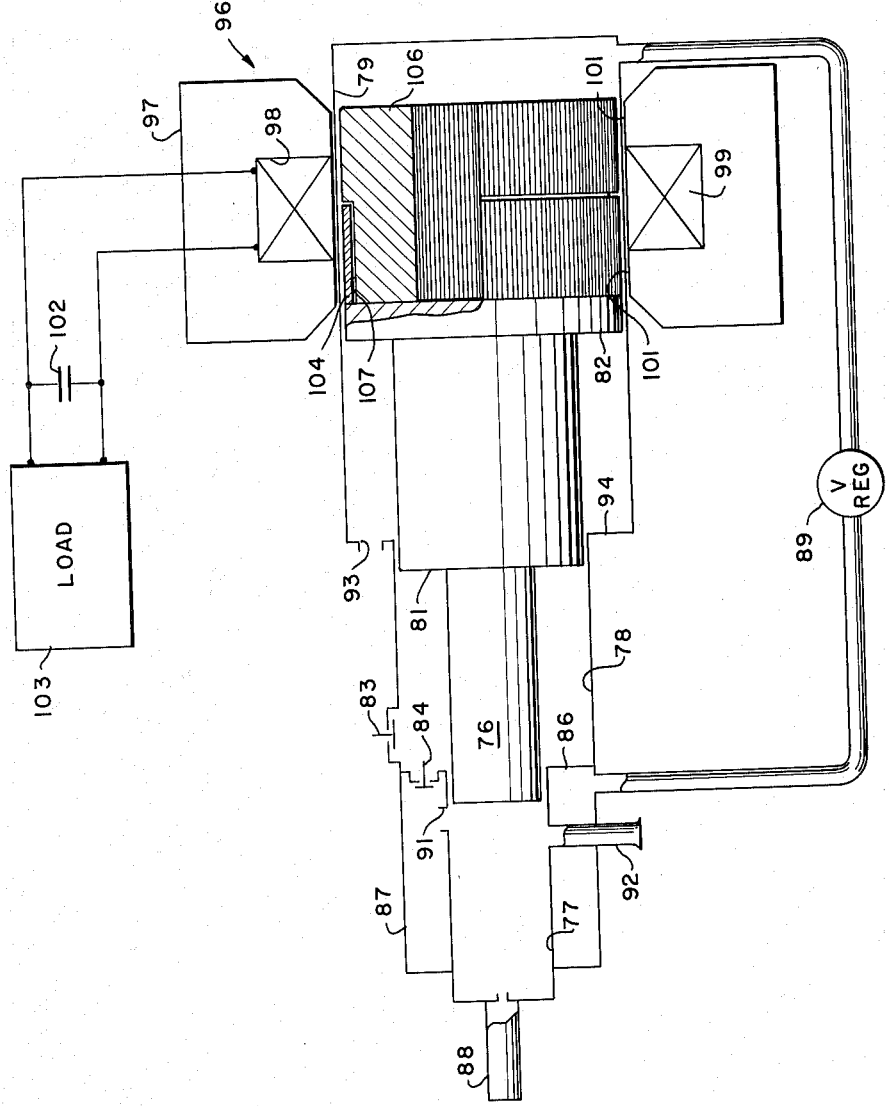

FIGURE 4 is an enlarged partial sectional view taken along line 4—4 of FIGURE 3, FIGURE 5 is an enlarged view of the area of FIGURE 3 enclosed by dashed line 5 thereon, and FIGURE 6 is a schematic view showing the adaptation of features of the invention to a differing form of free piston engine.

Referring now to the drawing and more particularly to FIGURE 1 thereof, elements of the invention are shown mounted on a free piston engine 11 of the class having a single combustion cylinder 12 with two opposed pistons 13 and 14 disposed for reciprocation therein.

Engines of this type are utilized as gas generators for operating turbines in electrical power stations as well as in such other applications as marine vessels and railroad locomotives and the detailed structure and method of operation of such engines are well understood within the art. A comprehensive description of an engine of this type may be found for example, by reference to "The Free-Piston Gas Generator," by G. Eichelberg, Schweiz. Bauzeitung, 1948, No. 45 and 49 (English translation printed by Jean Frey A.G., Zurich). Accordingly, the engine will be herein described only to the extent necessary for an understanding of the present invention.

During a compression stroke, pistons 13 and 14 are driven towards the center of cylinder 12 by compressed air contained within cylindrical housing 16 and 17 respectively. The air cushion housings 16 and 17 are of greater diameter than combustion cylinder 12 and are disposed coaxially at opposite ends thereof. Annular bounce pistons 18 and 19 are disposed coaxially within housings 16 and 17 respectively and are secured to the adjacent ends of engine pistons 13 and 14 for reciprocation therewith. The bounce pistons 18 and 19 have a diameter conforming to that of the housings 16 and 17 so that the power stroke of engine pistons 13 and 14 acts to compress air within the housings which air is then available to drive the engine pistons back towards the center of the combustion cylinder 12 during the subsequent compression stroke.

Since the area of the bounce pistons 18 and 19, against which the compressed air acts, is greater than that of the heads of the engine pistons 13 and 14, the maximum pressure within the air cushions need not be as great as the maximum engine compression pressure.

To provide fuel to the combustion cylinder 12 following each compression stroke, one or more fuel injectors 21 are mounted on the cylinder at a central position thereon. Injectors 21 are preferably of the type which are actuated by the rise in cylinder pressure as the pistons 13 and 14 approach each other, a suitable mechanism of this type being disclosed in co-pending application Serial No. 16,381 filed March 21, 1960, by the present inventor and entitled, Diesel Fuel Injector.

Owing to the compressive heating within the combustion cylinder 12, the fuel charge from injectors 21 immediately ignites and the resultant combustion pressure drives the engine pistons 13 and 14 outwardly to complete a power stroke and to re-compress air within the housings 16 and 17.

To provide for the storage of scavenging air, a cylindrical casing 22 is disposed coaxially around the combustion cylinder 12 and extends between air cushion housings 16 and 17, the casing being of substantially greater diameter than cylinder 12. One or more first check valves 23 are mounted in the walls 24 which separate casing 22 from housings 16 and 17 and a second set of check valves 26 are mounted in the outer walls of the housings adjacent the walls 24. First check valves 23 are arranged to permit the flow of air from housings 16 and 17 into casing 22 as the bounce pistons 18 and 19 approach the walls 24 and to block a reverse flow of air as the bounce pistons recede from the walls. Second check valves 26 permit atmospheric air to enter the housings 16 and 17 as th bounce pistons 18 and 19 recede from walls 24 and block the escape of air during the reverse piston movement. Thus the casing 22 is charged with high pressure air during the compression stroke of the engine.

Scavenging air inlet ports 27 are provided in the wall of combustion cylinder 12 near the position of maximum retraction of engine piston 14 and exhaust ports 28 are formed in the cylinder wall near the point of maximum retraction of piston 13. Since exhaust gas should be released from the cylinder 12 prior to the admission of the scavenging air, exhaust ports 28 are situated slightly closer to the center of the cylinder than inlet ports 27. A manifolding 29 is disposed around the cylinder 12, over the region of exhaust ports 28, and connects with a conduit 31 which projects radially through the wall of casing 22 to carry the exhaust gases away from the engine.

Thus as a power stroke is completed, piston 13 first uncovers exhaust ports 28 to release the combustion gases from cylinder 12 and subsequently piston 14 uncovers inlet ports 27 to admit a fresh charge of air into the cylinder from casing 22.

The engine 11 as described above is of conventional design, and has generally been utilized by coupling the exhaust conduit 31 to the intake of a gas turbine which mechanism drives a rotary load. For the purposes of the present invention, the engine 11 will generally be employed without the turbine although such utilization of the exhaust gas pressure may be made if desired.

Considering now the modifications to the engine 11 for effecting the objects of the present invention, annular stator assemblies 32 and 33 are mounted coaxially on air cushion housings 16 and 17 respectively. Each such stator assembly 32 and 33 includes an annular solenoidal coil 34 and 36 respectively, each such coil being centered on the midpoint of the volume swept by the associated engine bounce piston 18 and 19.

Coils 34 and 36 are electrically connected together, by leads 37 to form a series circuit which includes one or more capacitors 38. As will hereinafter be discussed in more detail, the parameters of the circuit, including the inductance of the coils and capacitance of capacitors 38, are selected to make the circuit resonant at the frequency of the output current which frequency is also the reciprocation frequency of the engine pistons 13 and 14. Owing to a magnetic coupling of the pistons to the field of the coils 34 and 36, which will also be hereinafter discussed, the parameters of the output circuit will, within limits, determine the reciprocation rate of the engine pistons. This coupling of the pistons to a synchronized resonating output circuit constitutes the highly advantageous parametric oscillator principle.

To maximize the inductance of the output circuit so that maximum coupling to the reciprocating engine pistons may be effected, annular iron yokes 39 and 41 are mounted coaxially around stator coils 34 and 36 respectively. Each such yoke 39 and 41 includes a thickness of iron encircling the outer surface of the associated coil and end portions, of similar thickness, extending radially inward on each side of the coil to the surface of the associated air cushion housing 16 and 17. The yokes 39 and 41 are thus of U-shaped cross section and form annular channels 42 in which the coils 34 and 36 are disposed.

The radially inwardly directed portions of each yoke 39 and 41 are tapered to be of reduced thickness at the surface of the adjacent air cushion housing 16 or 17, thereby forming a pair of spaced apart coaxial annular pole tips 43 encircling the housings within each stator assembly 32 and 33. The thickness of each pole tip 43 in the axial direction is that necessary to conduct the maximum magnetic flux from the coils and the greater thickness of the remainder of the iron around the coils is highly advantageous from the standpoint of reducing hysteresis losses.

To force oscillation of the inductance of the output circuit, thereby generating an alternating current therein, iron annuli 44 and 46 are carried by the reciprocating bounce pistons 18 and 19 respectively. Annuli 44 and 46 are coaxial with the stator assemblies 32 and 33 and are of sufficient length to span both pole tips 43 on the adjacent stator as well as the gap therebetween. The annuli 44 and 46 are preferably formed as an integal portion of the bounce pistons 18 and 19 and constitute the outer walls thereof.

Considering now certain of the basic principles of operation of the invention, it will be found that the reciprocation of the annuli 44 and 46 along the axis of the stator assemblies 32 and 33 will effect a transfer of the engine piston energy to the output circuit and any desired external electrical load 47 may be coupled to the generator by connecting the load across capacitors 38. Upon starting up, such factors as the residual magnetism of the annuli 44 and 46 and yokes 39 and 41, as well as eddy currents induced by movement of the annuli in the earth's magnetic field, will produce a very minute degree of coupling between the annuli and coils 34 and 36. Since the coils 34 and 36 together with capacitors 38 form a resonant circuit, the weak degree of coupling will produce a low amplitude current oscillation within the circuit. When the reciprocation rate of the annuli 44 and 46 approaches a value corresponding to the resonant frequency of the output circuit, strong coupling between the annuli and the coil fields occurs since the inductance of the output circuit is being forcibly oscillated at the resonant frequency thereof by movement of the iron annuli across the gaps between the stator pole tips 43. The amplitude of the oscillating current within the output circuit is therefore built up to very high values, the current being ultimately limited by the electrical resistance of the circuit together with that of the load 47.

A mathematical treatment of the energy transfer produced when the inductance of a resonant circuit is forcibly oscillated may be found by reference to U.S. Patent 2,904,701, hereinbefore identified. The energy transfer may be qualitatively understood by observing that the iron annuli 44 and 46 must work against the magnetic field of coils 34 and 36 while withdrawing from the gaps between the pole tips 43. Conversely the field does work on the annuli while the latter enter the gap. If the phase relationship between the annuli 44 and 46 and the oscillating field is such that the field has a lower intensity when the annuli enter the gap than when the annuli withdraw from the gap, then the net effect is work done on the field by the annuli. This net work must appear as current in the output circuit.

The necessary phase relationship between the annuli 44 and 46 is inherently maintained by the described structure. Should one of the annuli, such as annulus 44, attempt to withdraw from the associated gap in advance of the proper phasing, it will experience a stronger than normal retardation by the relatively more intense field. Conversely, should annulus 44 withdraw from the gap while lagging the proper phase relationship it will be retarded less than usual thereby restoring the normal phasing.

This phase stability of the annuli 44 and 46 relative to the electrical oscillation of the output circuit allows a considerable simplification of the engine 11. Heretofore engines of this type have required a complex mechanical linkage for assuring synchronization of the opposed pistons. Such linkage may be dispensed with in the present invention since, as described above, both annuli 44 and 46 are held at a fixed phase relationship with respect to the same output circuit and therefore the associated engine pistons 13 and 14 are effectively synchronized with each other.

For optimum efficiency, certain relationships between the proportions of the components of the generator should be met and certain structural details should be included therein.

Considering now a first such relationship, it may be seen that the magnetic flux of coils 34 and 36 must penetrate the iron of the annuli 44 and 46 and the volume of flux displaced can be no greater than the volume of iron in the annuli. If saturation is to be avoided, the maximum flux density within the annuli 44 and 46 will be around 15,000 gauss in which case the iron of the annuli can do useful electrical work at a maximum rate of about one joule per cubic centimeter of iron per half cycle. Accordingly, the volume of iron in annuli 44 and 46, measured in cubic centimeters, should be approximately equal to the useful work deliverable by engine pistons 13 and 14 measured in joules.

The engine 11, like most forms of internal combustion engine, will generally be found to deliver from one half to one joule per cubic centimeter of piston displacement volume per cycle. Therefore the volume of iron in the annuli 44 and 46 in a typical generator will be in the range of from one half to one times the displacement volume of the engine pistons 13 and 14. Such relationship should be understood to be approximate inasmuch as the characteristics of specific engines will vary somewhat. Prior forms of iron armature reciprocating generators however have not been designed from the standpoint of balancing engine piston energy with the energy delivered to the electrical system with the result that such generators dissipate much potentially available power.

If the maximum possible variation of the inductance of the output circuit is to be approached, each annulus 44 or 46 should, at its intermediate longitudinal position, span both pole tips 43 of the associated stator assembly as well as the gap between the pole tips. In each of its extreme longitudinal positions, the annulus 44 or 46 should just clear the gap between the pole tips 43. Therefore:

$$P_A = C + 2M$$

Where as indicated in FIGURE 1:
$P_A$ is the axial length of annulus 44 and 46,
$C$ is the width of the gap betwen pole tips 43, and
$M$ is the thickness of each pole tip 43 in the axial direction.

Similarly:

$$P_A + C = S$$

Where $S$ is the stroke of the engine piston 13 or 14. The foregoing two relationships fix the axial length of the stator assemblies 32 and 33, at the pole tips, and the axial length of the annuli 44 and 46 in terms of the engine stroke lingth.

Considerations which determine the volume of iron in the annuli 44 and 46 have been heretofore discussed. Given this volume, the radial thickness $P_R$ for an annulus of length $P_A$ and of a given diameter fixed by the engine design may readily be calculated. The pole tip thickness $M$ is preferably equated with $P_R$. To reduce hysteresis losses in the stator yokes 39 and 41, the thickness of iron around the coils 34 and 36, which thickness is designated $Y$ in FIGURE 1, is preferably made from 1.5 to 2 times the pole tip thickness $M$.

In addition to the proportioning of elements of the invention as discussed above, certain further structural features are of extreme importance from the standpoint of reducing power losses. Notably, the iron elements such as annuli 44 and 46 and stator yokes 39 and 41 should be provided with a radially laminated structure to substantially eliminate induced circumferential currents therein. Similarly, certain elements of the engine proximal to the stator assemblies 32 and 33 should be formed of non-magnetic material having high electrical resistance.

Referring now to FIGURES 2, 3 and 4 in conjunction, suitable detailed structure for the foregoing purposes is shown. The generator of FIGURES 2 to 4 is essentially similar to that shown schematically in FIGURE 1 and accordingly certain elements of the engine of FIGURES 2 to 4 will be identified by prime numbers corresponding to those of FIGURE 1. Detailed structure of the engine will be herein described only to the extent necessary for the adaptation of the present invention thereto, the basic detailed structure of the engine being fully disclosed in the G. Eichelberg reference hereinbefore identified.

Elements of the engine located remote from the stator assemblies 32' and 33' may be of the conventional construction described in the reference identified above. Such elements include the combustion cylinder 12' with opposed pistons 13' and 14' mounted for reciprocation therein, the cylinder having air inlet ports 27' located near one end and exhaust ports 28' near the opposite end with the exhaust ports opening into manifold 29' and exhaust conduit 31'. Other elements which are of conventional construction include the scavenging air casing 22' disposed coaxially around cylinder 12' and walls 24' which extend between the cylinder and casing at the ends thereof, the walls having first check valves 23' mounted therein.

Air cushion housing 16' is formed by a thin walled cylinder 48 disposed coaxially with respect the combustion cylinder 12' and spaced therefrom by an annular support member 49. Member 49, in which the second check valves 26' are mounted, is secured against the casing endwall 24' and is formed with a recess 51 around the inner rim of the opposite end to receive the end of the thin-walled cylinder 48. The housing 16' is completed by a dome shaped end member 52 secured coaxially against the outer end of the cylinder 48.

The cylinder 48 which forms the principal portion of the housing 16' should have the minimum wall thickness consistent with adequate strength to withstand the compressed air pressure within the housing and in addition must be nonmagnetic and have high electrical resistance. Stainless steel will be found to be a suitable material for this purpose. Similarly, support member 49 should be formed of non-magnetic high resistance material.

Considering now the internal construction of the stator assembly 32', and with reference to FIGURE 5 in addition to the previously specified Figures, the annular iron yoke 39' is formed of a plurality of thin flat iron leaves 53 of U-shaped configuration disposed together to form the yoke with the desired radially laminated structure. The leaves 53 should be extremely thin in relation to the circumference of the stator and may typically have a thickness of the order of 0.05 inch. The leaves 53 must be assembled around the annular stator coil 34' which is wound with a rectangular cross section fitting the channel 42' formed by the yoke. An insulative non-magnetic strap 54 encircles the stator assembly and is provided with inwardly directed lips 56 around each end to hold the stator assembly together. Preferably the entire stator assembly including both the yoke 39' and coil 34' is impregnated with a thermosetting plastic, such as epoxy resin, to form the whole into a solid gas-tight unit.

To mount the stator assembly 32' on housing cylinder 48 in coaxial relation thereon, the outer rim of support member 49 is beveled in order that the tapered pole tip 43' of the stator may be abutted thereagainst. A similarly beveled annular retainer 57 is fitted coaxially on the housing cylinder 48 on the opposite side of the stator assembly 32', such retainer also being of non-magnetic insulator material.

An annular protective cover 58 encloses the stator assembly 32' and may advantageously be formed integrally with the downwardly extending pedestal 59 which supports the end of the generator. Such cover 58 may constitute the air intake channel communicating with the intake check valves 26' in support member 49 and by proportioning the cover to be spaced from the stator assembly 32' the resultant air circulation around the stator will aid in the cooling thereof. The cover 58 is also preferably formed of non-magnetic material.

To form the bounce piston 18' within air cushion housing 16', an annular member 61 is disposed coaxially within the housing and is secured to the outer end of engine piston 13' by an endwall 62 on the member which extends radially inward to the piston. Member 61 is of less diameter than the housing 16' by an amount equal to the radial thickness of the iron annulus 44' carried by the bounce piston and is formed of non-magnetic high resistance material.

Iron annulus 44' is secured to member 61, in coaxial relationship thereon, by radially extending clamps 63 secured around the rim of member 61 at each end thereof. To provide for the radial laminations, annulus 44' is formed of a plurality of flat rectangular radially directed leaves 64 having a thickness similar to those of the stator yokes. Like the stator assembly, annulus 44' is impregnated with epoxy resin, or other suitable plastic compound, thereby forming the annulus into an integral unit in which piston ring retaining grooves 66 may be machined.

Since metal piston rings would be subject to heating from induced circumferential currents, the rings 67 are preferably of the O-ring variety and are formed of thermally stable high resistance material such as fluorocarbon plastic (Teflon).

A conventional stabilizing pipe 68 extends longitudinally within the generator, above the combustion cylinder 12', to connect the air cushion of housing 16' with that of housing 17' to maintain equal pressures therein. In addition, pipe 68 functions to prevent the pistons from rotating and connects the air cushions with a regulated compressed air supply 69 for controlling the average pressure within the cushions.

To provide for the transpiercing of the pipe 68 through the bounce piston 18', a bushing 71 is formed on the member 61 and non-conducting O-ring seals 72 are mounted therein.

Other elements of the engine such as piston coolant circulating conduits 73, combustion cylinder coolant jackets 74 and fuel injectors 21' at the center of the combustion cylinder may be of conventional design as described in the reference hereinbefore identified. While only the components of the generator which are associated with the stator assembly 32' have been herein described in detail, it should be understood that the like components associated with the opposite stator assembly 33' are of essentially similar construction.

Although the invention has been described with reference to a particular form of free piston engine, it should be understood that principles and features of the invention are applicable to other forms of engine having reciprocating elements. Referring now to FIGURE 6, for example, a single piston engine is shown, in schematic form, as modified to utilize concepts of the present invention. The engine of FIGURE 6 further illustrates techniques for using a stationary iron core within the reciprocating iron annulus to effect better coupling with a stator where the piston must be small and light.

In this form of engine, a single piston 76 is disposed for reciprocation in a combustion cylinder 77, one end of the piston being extended into a cylindrical compressor housing 78 which is disposed coaxially at the end of the combustion cylinder and which is of larger diameter. Compressor housing 78 opens into a still larger diameter air cushion housing 79 which is coaxial therewith and closed at the opposite end. Engine piston 76 is stepped to be of greater diameter within compressor housing 78 thereby forming a compressor piston 81 therein and is stepped again in cushion housing 79 to form a bounce piston 82 therein. A first check valve 83 is mounted in the wall of compressor housing 78 to admit atmospheric air thereto, while blocking the escape of air from the housing, and a second check valve 84 is disposed in an endwall 86 which separates the compressor housing chamber from an annular scavenging air storage vessel 87 disposed coaxially around the combustion cylinder 77.

Further elements of the engine include a fuel injector 88 mounted at the head of combustion cylinder 77 and a regulating valve 89 through which the scavenging air storage vessel 87 is communicated with the remote end of the air cushion housing 79, which valve acts to maintain the pressure in the latter at a pre-set necessary level. An intake port 91 is provided in the wall of combustion cylinder 77 near the point of maximum retraction of the piston 76, the port opening into the scavenging air storage vessel 87. An exhaust conduit 92 is transpierced through the vessel 87 and opens into the combustion cylinder 77 at a position which is a slight distance closer to the cylinder head than intake port 91. To relieve the pressure at the side of the bounce piston 82 opposite from the air cushion, a vent port 93 is provided in the endwall 94 of housing 79 adjacent compressor housing 78.

Movement of the engine piston 76 towards fuel injector 88 acts to compress the air charge within combustion cylinder 77 and ultimately initiates operation of the fuel injector 88. Concurrently, the compressor piston 81 compresses air within housing 78 and the high pressure air is transferred to scavenging air storage vessel 87 through check valve 84. Should the pressure within the air cushion 79 be at less than the desired value, a transfer of air from vessel 87 to the cushion, through regulating valve 89, will occur when the pistons are in the described position.

Ignition of the fuel charge drives engine piston 76 away from the cylinder head to complete a power stroke and to recompress the air within cushion housing 79. Upon movement of the engine piston past exhaust conduit 92, combustion gases are released from the cylinder 77 and the subsequent uncovering of the intake port 91 admits scavenging air to the cylinder thereby preparing the engine for the following compression stroke. It should be noted that the greater diameter of the bounce piston 82 relative to the engine piston 76 allows a higher degree of compression to be produced in the engine cylinder 77 than exists in the air cushion itself.

Considering now the additional structure for obtaining electrical power from the above described engine, an annular stator assembly 96 is disposed coaxially around the air cushion housing 79. Stator assembly 96 may be essentially similar in construction to those previously described in conjunction with the engine of FIGURES 1 to 4 and thus includes an annular iron yoke 97 having a coaxial channel 98 formed around the inner surface thereof and an annular coil 99 mounted in the channel.

Channel 98 thus divides the inner surface of the yoke 97 into two spaced apart coaxial pole tips 101 which preferably have the tapered construction hereinbefore described.

To reduce losses from induced currents the stator yoke 97 is formed with the radially laminated construction hereinbefore described.

Coil 99 is coupled to a capacitor 102 across which any desired external electrical load 103 may be connected. The capacitor 102 and coil 99 have parameters selected to form a circuit resonant at a frequency corresponding to the reciprocation rate of the engine piston 76.

To couple the reciprocating elements of the engine with the output circuit, a radially laminated iron annulus 104 is mounted on bounce piston 82, in coaxial relationship thereon, the annulus having an outer diameter corresponding to that of the inner diameter of cushion housing 79. In order to minimize the mass of the reciprocating elements of the engine, and thereby allow for a relatively high reciprocation rate and output frequency, the annulus 104 may have a relatively thin radial thickness and be of substantially less axial length than the stator assembly 96. Under this condition, the annulus 104 is positioned where it will completely retract from within the innermost pole tip 101 at one extreme of its reciprocating motion and will extend completely through the same pole tip at the opposite extreme of the motion.

To maximize the coupling between the annulus 104 and the stator 96 in the above described arrangement, it is desirable that the magnetic circuit be completed by an annular iron core 106 disposed coaxially within the housing 79 on the side of the bounce piston 82 which is opposite from engine piston 76. Core 106 has an axial length sufficient to overlap each stator pole tip 101 and to span the gap therebetween. The core 106 has a recess 107 formed around the rim thereof for receiving the reciprocating annulus 104 during the final portion of a power stroke. Core 106 must be formed with the same radially laminated structure as the stator yoke 97 and annulus 104.

An alternating current is generated in the circuit of coil 99 and capacitor 102 in a manner similar to that hereinbefore described. In particular, the periodic movement of the annulus 104 into the gap in the stator magnetic circuit formed by core recess 107 acts to oscillate the inductance of the output circuit at the resonant frequency thereof. The phase stability effect by which the piston reciprocation rate is locked to the resonant frequency of the output circuit is characteristic of the generator of FIGURE 6 for the reasons which have been hereinbefore discussed with reference to the apparatus of FIGURES 1 to 4.

While the invention has been disclosed with reference to certain specific exemplary embodiments, it will be apparent to those skilled in the art that numerous variations and modifications are possible within the spirit and scope of the invention and thus it is not intended to limit the invention except as defined in the following claims.

What is claimed is:

1. Apparatus for the direct generation of electrical energy from a reciprocating element of an internal combustion engine of the class having a reciprocating piston comprising, in combination, an annular yoke encircling the axis of reciprocation of said engine element and being formed of ferromagnetic material, said yoke being formed with a central channel opening at the surface facing said engine element which channel separates spaced apart coaxial annular pole tips formed by said yoke, an annular coil encircling said axis and mounted within said channel of said yoke, at least one capacitor coupled to said coil and forming a resonating circuit therewith, and a ferromagnetic annulus carried on said reciprocating element of said engine in coaxial relationship with said yoke, said annulus having a diameter substantially exceeding that of said engine piston.

2. In apparatus for directly obtaining electrical power from a reciprocating element of an internal combustion engine of the class having a reciprocating piston, the combination comprising an annular ferromagnetic yoke disposed coaxially with respect to the axis along which said engine element reciprocates, said yoke having an annular channel facing said engine element which channel separates two coaxial pole tips formed by said yoke, each of said pole tips having an axial thickness which when combined with the axial thickness of said channel is substantially equal to one half of the stroke said engine piston, a ferromagnetic annulus mounted coaxially on said reciprocating element of said engine and having a volume of from one half to one times the displacement volume of said engine piston, said annulus having a length in the axial direction which is substantially equal to the axial thickness of both of said pole tips combined with the axial width of said channel, an annular coil mounted in said channel of said yoke in coaxial relationship therewith, and at least one capacitor coupled to said coil and forming an output circuit resonant at a frequency corresponding to the reciprocation rate of said engine piston.

3. Apparatus for the direct generation of electrical power from a free piston engine of the class having a pair of opposed pistons reciprocating in a common engine cylinder, comprising a pair of reciprocating ferromagnetic annuli, each being carried by a separate one of said pistons, a pair of spaced apart annular stator coils each being disposed in the region of a separate one of said pistons and encircling the axis along which said piston reciprocates, and an electrical energy storage device coupled to each of said stator coils and forming a resonant circuit in conjunction therewith.

4. Apparatus for the generation of electrical power as described in claim 3 wherein said electrical energy storage device and each of said coils are connected together in series relationship.

5. In apparatus for obtaining electrical energy directly from a free piston engine of the class having a pair of opposed engine pistons reciprocating in a common engine cylinder, each of said engine pistons carrying a bounce piston for compressing a volume of gas to provide for the power stroke of the associated engine piston, the combination comprising a pair of ferromagnetic annuli each mounted coaxially on a separate one of said bounce pistons and each having a greater diameter than the associated engine piston, a pair of ferromagnetic stator yokes each being disposed coaxially around a separate one of said bounce pistons, each of said yokes having an annular channel on the inner face dividing said face into two spaced apart coaxial annular pole tips, a pair of annular coils each being mounted coaxially within said channel of a separate one of said yokes, and at least one capacitor coupled to both of said coils and forming a resonant circuit in conjunction therewith.

6. Apparatus for obtaining electrical energy directly from a free piston engine as described in claim 5 and wherein each of said stator yokes and each of said annuli are formed by a plurality of thin flat radially directed plates secured together to provide said members with a radially laminated structure whereby induced circumferential currents in said members are minimized.

7. Apparatus for obtaining electrical energy directly from a free piston engine as described in claim 5 wherein said pole tips of each of said stator yokes are tapered to have a reduced width in the axial direction relative to the adjacent portions of said yoke and wherein the thickness of said ferromagnetic annuli in the radical direction is substantially equal to the width of said pole tips.

8. Apparatus for obtaining electrical energy directly from a free piston engine as described in claim 5 wherein the width of a pole tip of said stator yokes in the axial direction combined with the axial width of the adjacent channel is equal to substantially one half of the stroke of one of said engine pistons and wherein each of said ferromagnetic annuli have an axial length substantially equal to the axial width of said channel combined with twice the axial width of said pole tip.

9. Apparatus for obtaining electrical energy directly from a free piston engine as described in claim 5 wherein each of said annuli are formed of a volume of iron about equal to one half to one times the displacement volume of a single one of said engine pistons.

10. Apparatus for the direct generation of electrical energy from a reciprocating element of an engine comprising, in combination, an annular radially laminated ferromagnetic stator yoke encircling the axis along which said engine element reciprocates and having an annular channel on the inner face, a coil disposed coaxially within said channel, an electrical energy storage device coupled to said coil and forming a resonant circuit in conjunction therewith, a radially laminated ferromagnetic annulus disposed coaxially wtih respect to said stator yoke and carried by said engine element for reciprocation therewith, and a stationary core of radially laminated ferromagnetic material disposed coaxially within said annular stator yoke and having a lesser diameter than said yoke whereby reciprocation of said annulus periodically carries said annulus between said core and said yoke.

11. Apparatus for the direct generation of electrical energy from a reciprocating element of an internal combustion engine of the class having a reciprocating piston comprising, in combination, an annular yoke encircling the axis of reciprocation of said engine element and being formed of ferromagnetic material, said yoke being formed with a central channel opening at the surface facing said engine element which channel separates spaced apart coaxial annular pole tips formed by said yoke, said pole tips having a reduced thickness in the axial direction relative to the body of said yoke, an annular coil encircling said axis and mounted within said channel of said yoke, at least one capacitor coupled to said coil and forming a resonating circuit therewith, and a ferromagnetic annulus carried on said reciprocating element of said engine in coaxial relationship with said yoke, said annulus having a diameter substantially exceeding that of said engine piston.

12. Apparatus for the direct generation of electrical energy from a reciprocating element of an internal combustion engine of the class having a reciprocating piston comprising, in combination, an annular yoke encircling the axis of reciprocation of said engine element and being formed of ferromagnetic material, said yoke being formed with a central channel opening at the surface facing said engine element which channel separates spaced apart coaxial annular pole tips formed by said yoke, an annular coil encircling said axis and mounted within said channel of said yoke, at least one capacitor coupled to said coil and forming a resonating circuit therewith, and a ferromagnetic annulus carried on said reciprocating element of said engine in coaxial relationship with said yoke, said annulus having a diameter substantially exceeding that of said engine piston and having a thickness in the radial direction which is substantially equal to the width of a pole tip of said yoke as measured in the axial direction.

13. Apparatus for the direct generation of electrical eenrgy from a reciprocating element of an internal combustion engine of the class having a reciprocating piston comprising, in combination, an annular yoke encircling the axis of reciprocation of said engine element and being formed of ferromagnetic material, said yoke being formed with a central channel opening at the surface facing said engine element which channel separates spaced apart coaxial annular pole tips formed by said yoke, an annular coil encircling said axis and mounted within said channel of said yoke, at least one capacitor coupled to said coil and forming a resonating circuit therewith, and a ferromagnetic annulus carried on said reciprocating element of said engine in coaxial relationship with said yoke, said annulus having a diameter substantially exceeding that of said engine piston and having a length along the axis thereof which is substantially equal to the width of both of said pole tips in the axial direction combined with the separation therebetween.

14. Apparatus for the direct generation of electrical energy from a reciprocating element of an internal combustion engine of the class having a reciprocating piston comprising, in combination, an annular yoke encircling the axis of reciprocation of said engine element and being formed of ferromagnetic material, said yoke being formed with a central channel opening at the surface facing said engine element which channel separates spaced apart coaxial annular pole tips formed by said yoke, an annular coil encircling said axis and mounted within said channel of said yoke, at least one capacitor coupled to said coil and forming a resonating circuit therewith, and a ferromagnetic annulus carried on said reciprocating element of said engine in coaxial relationship with said yoke, said annulus having a diameter substantially exceeding that of said engine piston, the separation between said pole tips of said yoke being substantially equal to the stroke of said engine piston minus the length of said ferromagnetic annulus as measured in the axial direction.

References Cited by the Examiner

UNITED STATES PATENTS

| | | | |
|---|---|---|---|
| 2,362,151 | 11/1944 | Ostenberg | 290—1 |
| 2,787,718 | 4/1957 | Dooling | 310—30 |
| 2,900,592 | 8/1959 | Baruch | 310—17 |
| 2,904,701 | 9/1959 | Colgate | 310—17 |
| 2,992,342 | 7/1961 | Schmidt et al. | 290—1 X |
| 3,024,374 | 3/1962 | Stauder | 310—15 |
| 3,105,153 | 9/1963 | James | 290—1 |

ORIS L, RADER, *Primary Examiner.*

MILTON O. HIRSHFIELD, *Examiner.*